Figure 1:
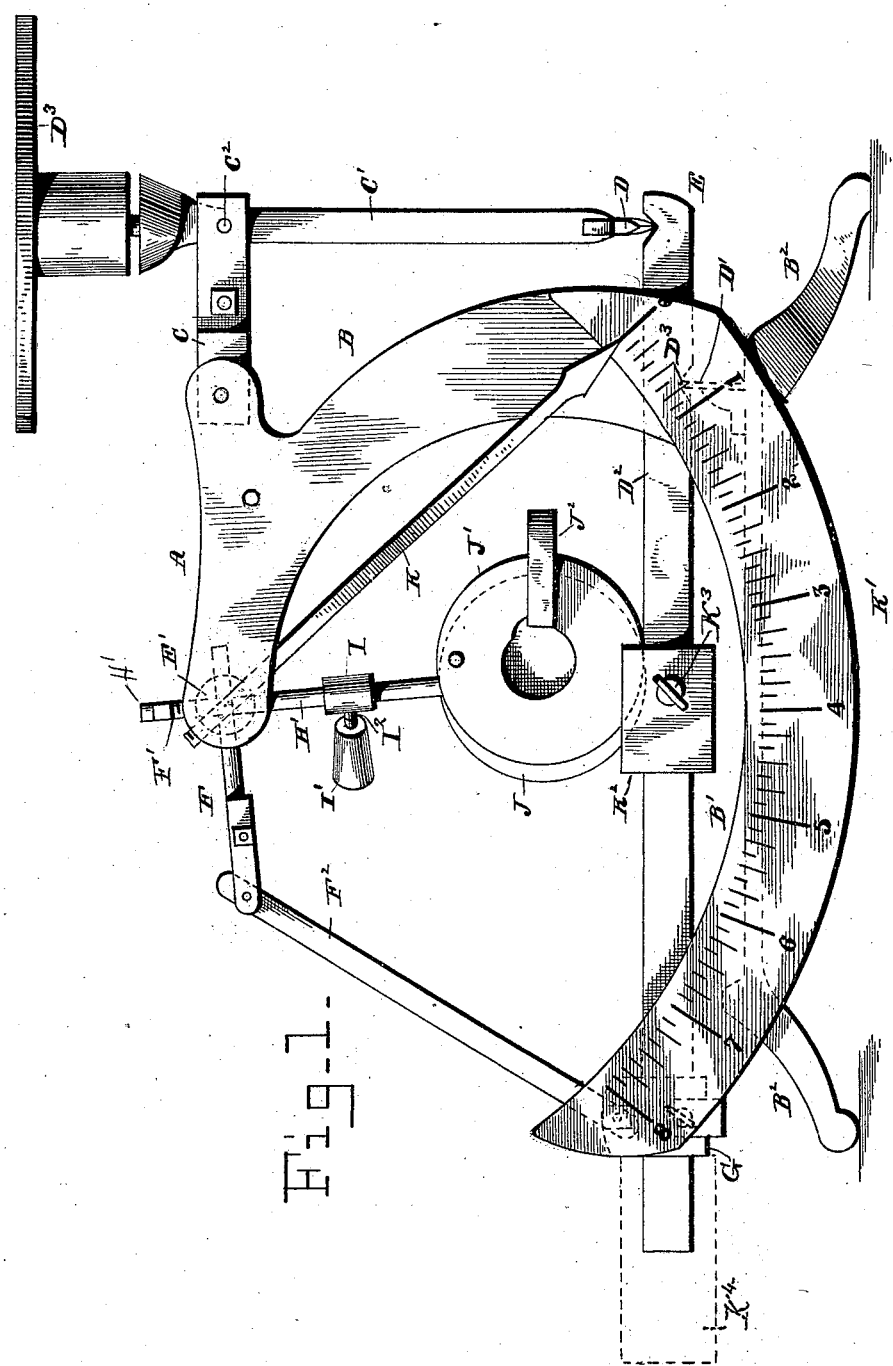

(Model.)

E. SIRRET.
WEIGHING SCALE.

No. 296,470. Patented Apr. 8, 1884.

2 Sheets—Sheet 1.

WITNESSES
Edwin L. Yewell.
Edwin L. Bradford

INVENTOR
Emile Sirret
By Toulmin & Jemmes
his Attorneys.

(Model.)
2 Sheets—Sheet 2.
E. SIRRET.
WEIGHING SCALE.
No. 296,470.
Patented Apr. 8, 1884.
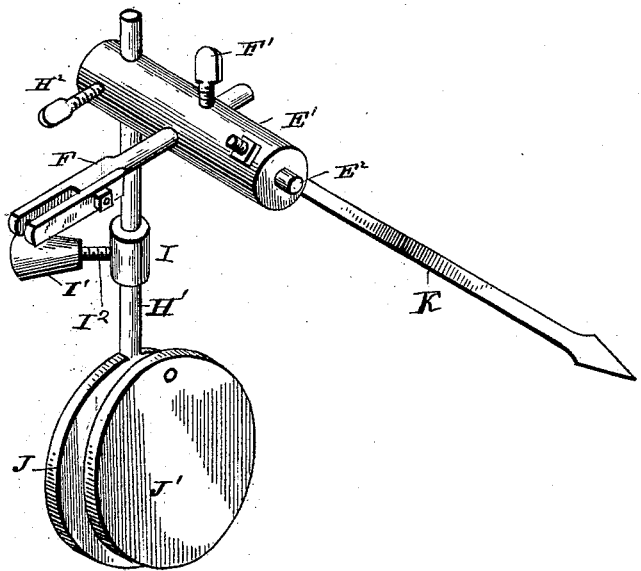
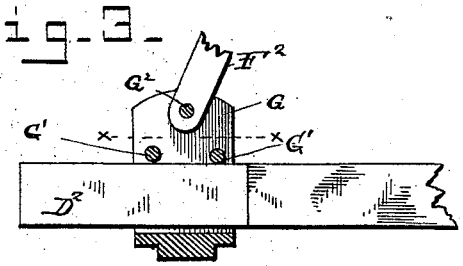
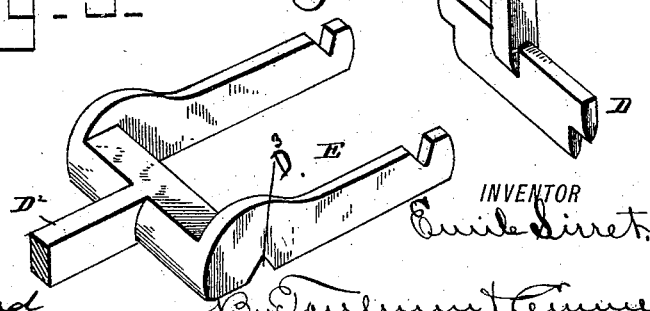
WITNESSES
Edwin L. Yewell
Edwin L. Bradford
INVENTOR
Emile Sirret.
By Toulmin & Jeunies
his Attorneys

United States Patent Office.

EMILE SIRRET, OF BUFFALO, NEW YORK.

WEIGHING-SCALE.

SPECIFICATION forming part of Letters Patent No. 296,470, dated April 8, 1884.

Application filed December 18, 1883. (Model.)

*To all whom it may concern:*

Be it known that I, EMILE SIRRET, a citizen of the United States, residing at Buffalo, in the county of Erie and State of New York, have invented a new and useful Weighing-Scale, of which the following is a specification.

This invention relates to certain new and useful improvements in weighing-scales, having special reference to that class known as pendulum-scales.

It has for its objects, first, to provide a scale whose indicating-hand shall accurately register the quantity weighed upon a dial or graduated plate whose division-marks are equidistant; second, to provide a scale of this character which shall be capable of minute adjustments, whereby any variation incident to changes of the temperature may be corrected; third, to provide a scale whose supporting-platform shall not exert any weight upon the supporting points of the pendulum-shaft; fourth, to provide a pendulum whose weights shall be independent and relatively eccentrically supported; and, fifth, to provide a pendulum whose weights shall be independent and relatively eccentrically supported, and whose arm or stem shall be provided with a pea capable of radial and circumferential adjustment.

In the accompanying drawings, forming a part of this specification, and on which the same letters of reference indicate corresponding features, Figure 1 represents a side elevation of my improved scale; Fig. 2, a detached perspective view of the pendulum, its supporting-shaft, and the indicating-hand; Fig. 3, a side elevation of a portion of the beam, showing in section an adjustable collar fitted thereon; Fig. 4, a plan view of the same portion of the beam, showing the adjusting-collar in horizontal section; and Fig. 5, a detached perspective view of a portion of the beam and the platform-standard.

The letter A designates the frame of my improved scale, the same consisting of the approximately upright portions B, (only one of which is shown,) and the horizontal part B', from which project at each end the legs $B^2$.

This frame is constructed of cast-iron, preferably, and to the upper portion of it is pivotally connected the guiding-arm C, the free end of which is bifurcated to receive the standard C', this connection being made by means of a pin, $C^2$. This pin may be constructed with a knife-edge, if desired, and the opening in the standard through which it passes may be formed accordingly. The lower end of this standard is provided with a knife-edged cross-head, D, whose outer ends are shouldered to prevent lateral displacement, and the upper end with the platform $D^2$.

Mounted on a knife-edge, D', which extends transversely to the base-piece B', and which is cast or otherwise secured thereto, is the beam $D^2$. One end of this beam is provided with a cross-head, from which extend the arms E, the lower edges of which are notched at $D^3$ to fit over the knife-edge D', and the upper edges near the ends are also notched, so as to receive the cross-head D of the standard C'. By this means, it will be observed, the standard C' is free to move up and down, and yet it maintains a vertical position, this latter result being due to the approximate equality of the distance between the pivotal points of the arm C and the pin $C^2$, and the distance between the notches $D^3$ in the arms E, and the contact of the cross-head with the said arm.

A transverse pendulum-shaft, E', is delicately mounted in the upper part of the frame A on points or studs $E^2$. Extending through this shaft transversely is a short arm, F, a set-screw, F', being provided so as to fix its radius. One end of the said arm terminates in a bifurcation, which receives a link, $F^2$, to which it is pivotally connected. The lower end of this link is also pivotally connected by means of a pin, $G^2$, with an adjustable collar, G, which fits over and is adapted to slide on the long arm of the beam $D^2$. The beam at the part which is occupied by this collar may, if desired, be reduced in size, and the collar may be constructed in any approved manner. In the present instance it consists of two jaws united at one end and provided near the other with connecting-bolts G', whereby the said jaws may be delicately adjusted against the points of the pin $G^2$, so as to take up any lost motion incident to wear at this point. The collar is further provided with a set-screw, H, which serves to fix its position on the beam.

The letter H' designates the pendulum rod or stem, the upper end of which is adjustably connected with the pendulum-shaft E', a set-screw, H², being in this instance employed to hold the same in any fixed position, though any other means for this purpose may be adopted. A collar, I, is loosely fitted on this stem, and is provided with an adjusting weight or pea, I', having a threaded extension, I², which screws into the collar I, whereby its position is fixed on the stem. This weight or pea, it will thus be observed, is capable of radial adjustment relatively with the pivotal points of the pendulum-shaft—that is, it is adjustable up and down on said shaft—and is also adjustable circumferentially, whereby its influence over the normal position of the stem H' is regulated. The lower end of this stem is provided with a disk forming a weight, J, this disk being rigidly connected with it. Pivotally connected with said disk, at a point eccentric to the pivotal points or center of oscillation of the pendulum-shaft, is a second disk or weight, J', a stop, J², being attached to the disk J, and embracing the pivoted disk to limit the swing of the latter in one direction when the pendulum-stem is moved out of normal position.

The letter K designates the indicating-hand, the same being secured to the pendulum-shaft E', and extended radially therefrom until it reaches the graduated scale marked on the plate K'.

It will be observed that the pound-marks are all at equal distances apart, and that the marks which indicate fractions of pounds between each of the pound-marks are also relatively at equal distances apart. This result is attained by the use of the weight J', pivoted eccentrically to the pivotal points of the pendulum-shaft, and I have found by actual experiment that if the pendulum-weight is not so pivotally arranged the indicating-hand will not travel the same relative distance before reaching the division marked 3 and after reaching the division marked 5 by the increase of additional weight on the platform—that is to say, the indicating-hand, when caused by a given amount of weight to reach a certain division on the dial-plate less than the division marked 3 or more than the division marked 5, will not move to the next division by an additional amount of weight equal to that designated by the said next division-mark. This difficulty is completely overcome by the pivoted weight of the pendulum, as above described.

A weight, K², having a set-screw, K³, is fitted on the beam D², so as to facilitate in effecting the adjustment of the scale to make the hand normally stand at zero. Another weight or pea, K⁴, (indicated in dotted lines in Fig. 1,) may be resorted to and applied to the end of the beam D² when it is desired to weigh bodies heavier than would be registered by the graduated scale, this weight being equal to one, two, or three pounds, or more, as the case may be, according to the weight placed on the platform.

After the parts of the scale are manufactured and put together, the indicating-hand is to be set so as to stand normally at zero. This is approximately done by adjusting the arm F in the pendulum-shaft E', and the collar G and weight K² on the beam D². To bring the hand accurately over the mark zero, the adjustable pea or weight I' is resorted to, and it will be observed from Fig. 1 that the more this weight is adjusted circumferentially, so as to come more nearly in the same vertical plane as the disk J of the pendulum, the farther the pendulum-stem will depart from the perpendicular. Therefore, if the angle between the hand and the pendulum-stem is not just right, so as to bring the hand over zero normally, it can be brought there by the adjustment of the weight I'.

Having thus fully described my invention, what I claim as new, and desire to secure by Letters Patent, is—

1. In a scale, the combination, with the indicating-hand and a graduated plate having indicating-marks, of a pendulum having a weight supported eccentrically to the pivotal points of the pendulum-support.

2. In a scale, the combination, with an indicating-hand, a pendulum, and a shaft upon which the hand and the pendulum are mounted, the pendulum being provided with a weight supported eccentrically to the axis of said shaft, of a graduated scale having equidistant indicating-marks.

3. In a scale, the combination, with the pendulum, of a supplemental weight connected thereto eccentrically to the point of oscillation of the pendulum.

4. In a scale, the combination, with the pendulum having a supplemental weight connected thereto eccentrically to the point of oscillation of the pendulum, and a stop to limit the movement of the said supplemental weight, of a pea connected to the pendulum and capable of adjustment radially from the point of oscillation and circumferentially around the pendulum-stem.

5. In a scale, the combination, with the supporting-platform and the pivoted guide, of the pivoted beam, the pendulum-shaft, the means for connecting the beam and the shaft, the shaft being provided with an indicating-hand, and a pendulum having a supplemental weight supported eccentrically to the point of oscillation of said shaft.

6. In a scale, the combination, with the supporting-platform, the standard, and the pivoted guide-arm, of the pivoted beam having an adjustable collar, the pendulum-shaft provided with an adjustable arm, and the link connecting the arm and the collar together.

7. In a scale, the combination, with the supporting-platform, the standard, and the pivoted guide-arm, of the pivoted beam, the distance between the pivotal points of the arm and its connection with the standard being
5 approximately the same as the distance between the pivotal point of the beam and its contact with said standard, and the pendulum-shaft having an adjustable arm, the beam and shaft being adjustably connected together.

EMILE SIRRET.

Witnesses:
  BERNARD KENNEY,
  JAMES M. CLOAK.